No. 607,226. Patented July 12, 1898.
L. P. DISS.
TYPE WRITING MACHINE.
(Application filed Jan. 16, 1895.)

(No Model.) 7 Sheets—Sheet 1.

WITNESSES:

INVENTOR
Louis P. Diss
BY
Jacob Felbel,
ATTORNEY

No. 607,226. Patented July 12, 1898.
L. P. DISS.
TYPE WRITING MACHINE.
(Application filed Jan. 16, 1895.)
(No Model.) 7 Sheets—Sheet 2.
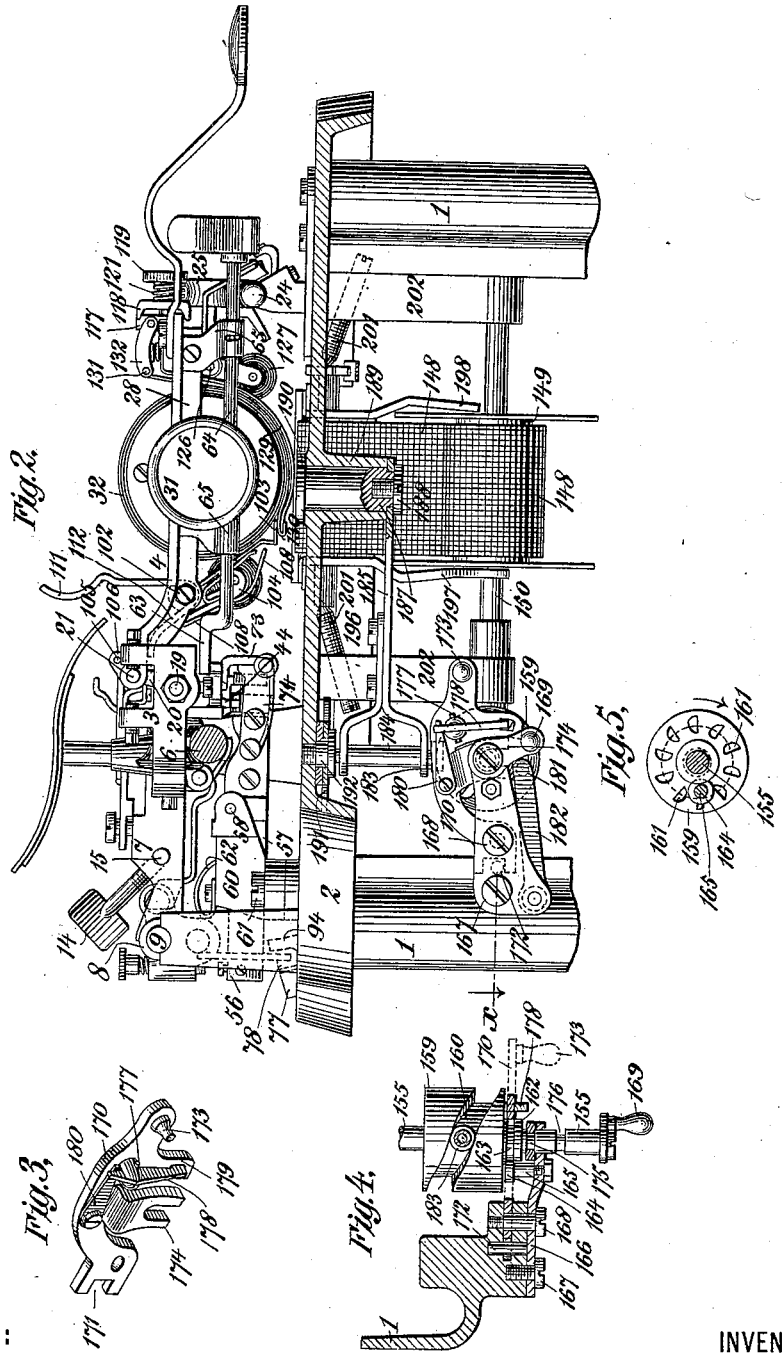
WITNESSES:
INVENTOR
Louis P. Diss
BY
Jacob Felbel
ATTORNEY No. 607,226. Patented July 12, 1898.
L. P. DISS.
TYPE WRITING MACHINE.
(Application filed Jan. 16, 1895.)
(No Model.) 7 Sheets—Sheet 3.

WITNESSES: INVENTOR
Louis P. Diss
BY
Jacob Felbel
ATTORNEY

No. 607,226. Patented July 12, 1898.
L. P. DISS.
TYPE WRITING MACHINE.
(Application filed Jan. 16, 1895.)
(No Model.) 7 Sheets—Sheet 4.
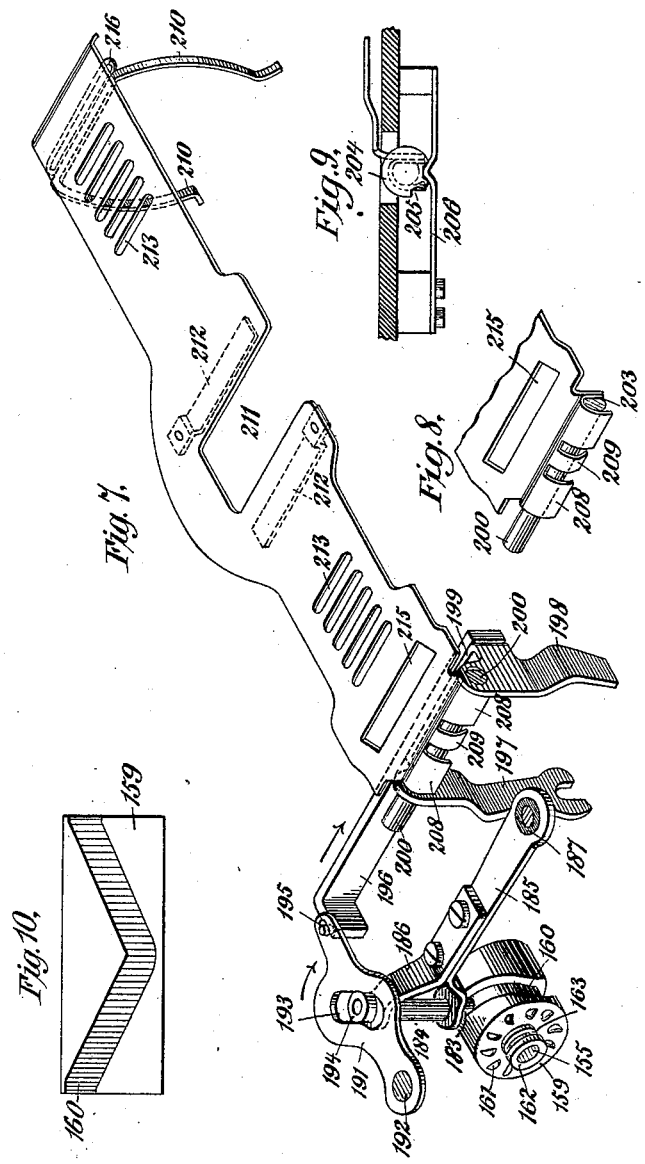
WITNESSES: INVENTOR
Louis P. Diss
BY
Jacob Felbel
ATTORNEY No. 607,226.
L. P. DISS.
TYPE WRITING MACHINE.
(Application filed Jan. 16, 1895.)
Patented July 12, 1898.
(No Model.)
7 Sheets—Sheet 5.
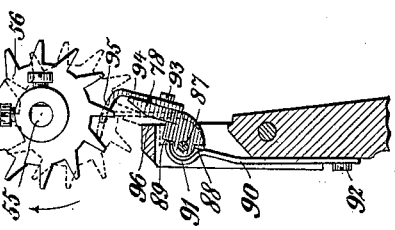
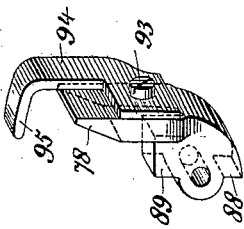
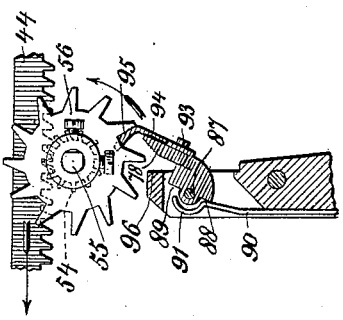
WITNESSES:
INVENTOR
Louis P. Diss
BY
Jacob Felbel
ATTORNEY

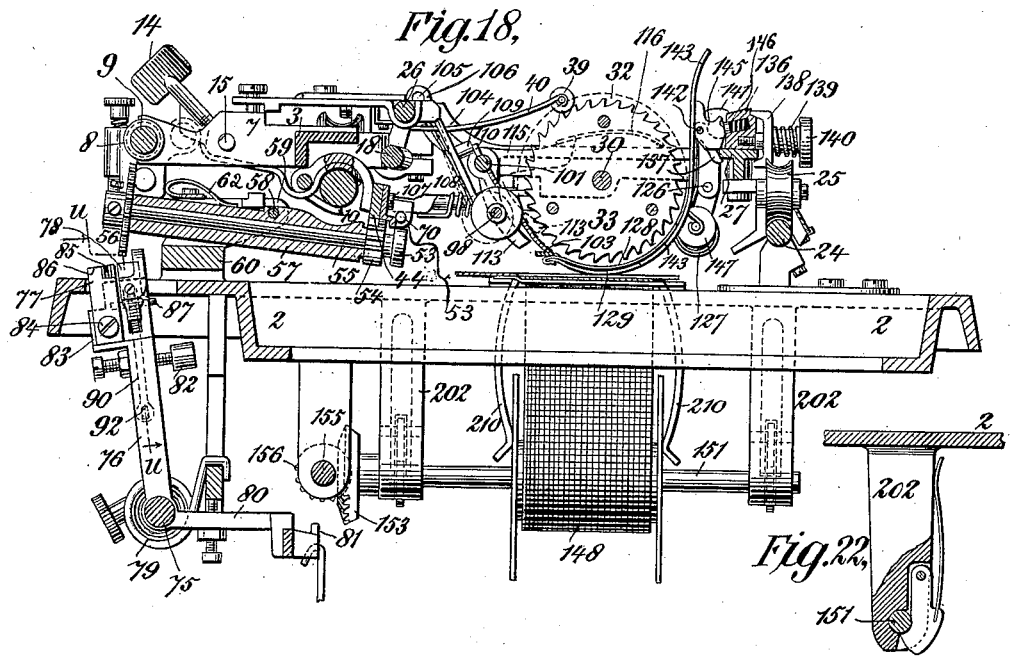

No. 607,226. Patented July 12, 1898.
L. P. DISS.
TYPE WRITING MACHINE.
(Application filed Jan. 16, 1895.)
(No Model.) 7 Sheets—Sheet 7.

WITNESSES: INVENTOR

Louis P. Diss
BY
Jacob Felbel
ATTORNEY

UNITED STATES PATENT OFFICE.

LOUIS P. DISS, OF ILION, NEW YORK, ASSIGNOR TO THE WYCKOFF, SEAMANS & BENEDICT, OF NEW YORK, N. Y.

TYPE-WRITING MACHINE.

SPECIFICATION forming part of Letters Patent No. 607,226, dated July 12, 1898.

Application filed January 16, 1895. Serial No. 535,089. (No model.) Patented in England December 27, 1894, No. 25,155.

*To all whom it may concern:*

Be it known that I, LOUIS P. DISS, a citizen of the United States, and a resident of Ilion, in the county of Herkimer and State of New York, have invented certain new and useful Improvements in Type-Writing Machines, of which the following is a specification.

My improvements relate to the carriage feeding or escapement mechanism, the inking-ribbon-feeding mechanism, the paper-feeding mechanism, and to various other devices relating thereto, all as will hereinafter more fully appear; and my improvements consist in the various features of construction and combinations of devices hereinafter set forth, and clearly defined in the appended claims.

This invention has been patented in Great Britain under Letters Patent No. 25,155, dated December 27, 1894.

Figure 1:
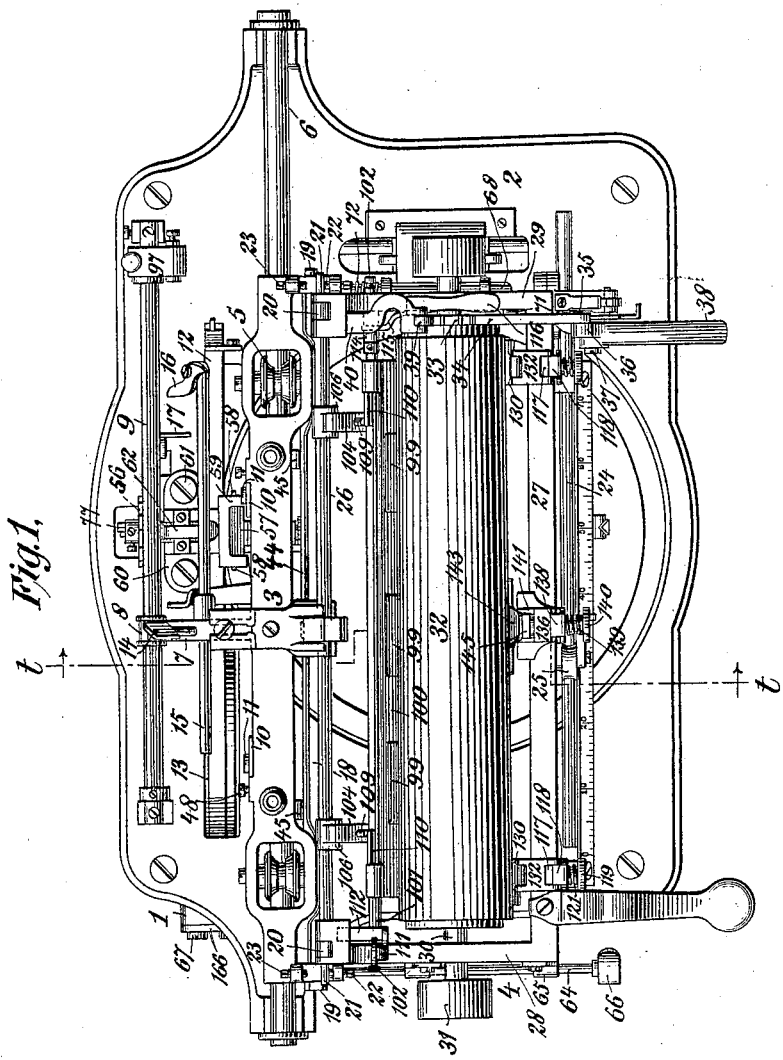
Figure 6:
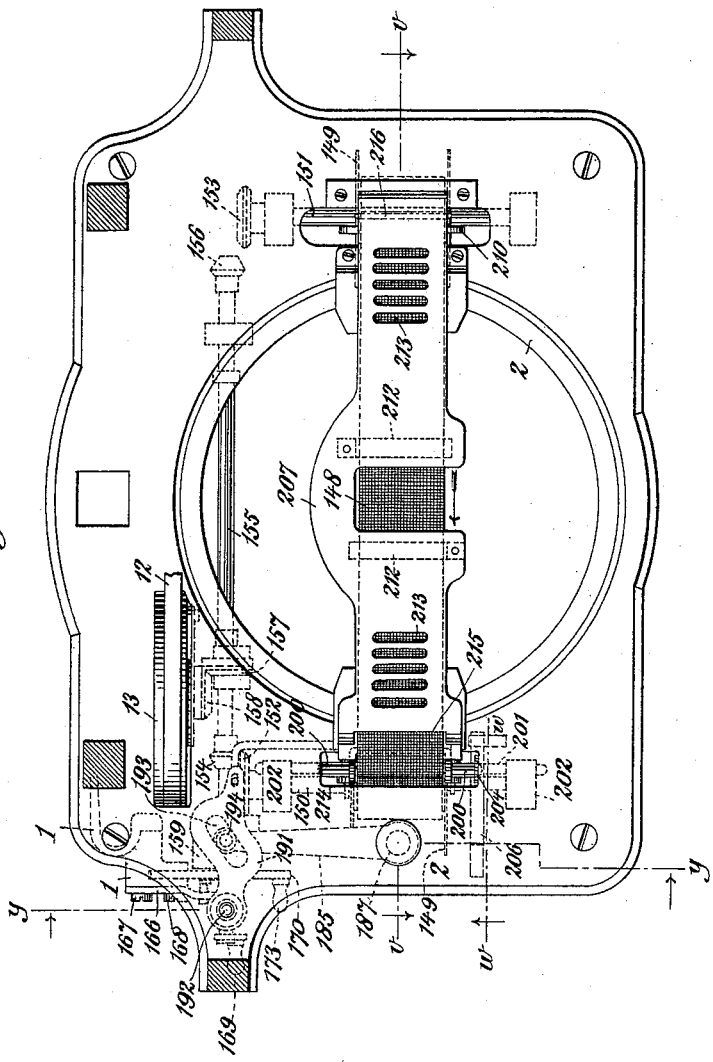
Figure 23:
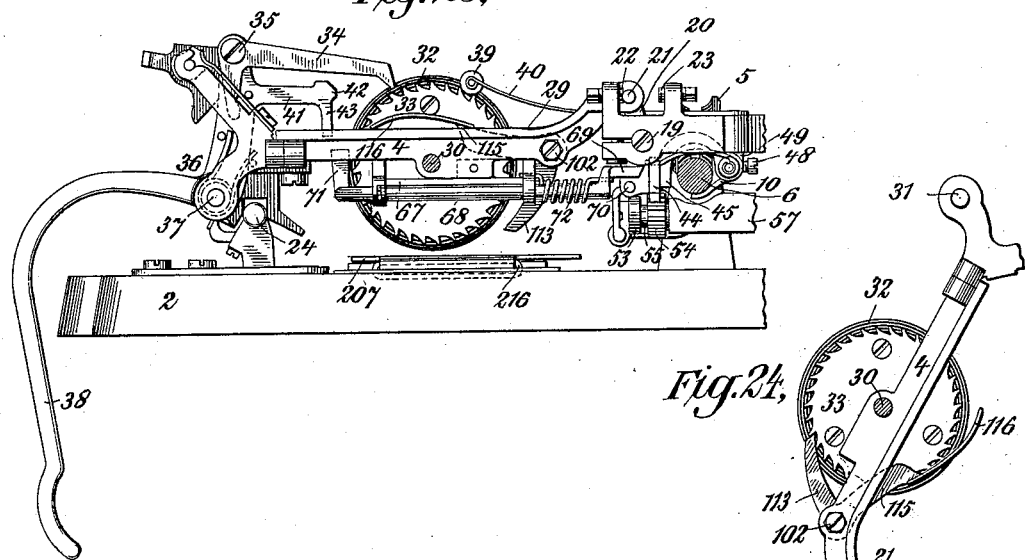
Figure 24:
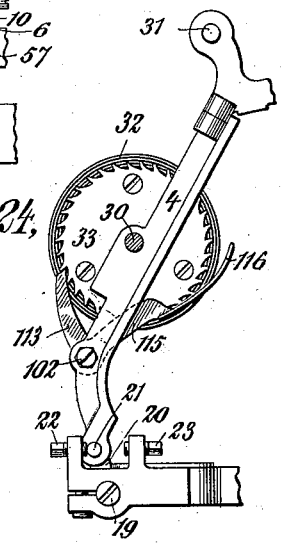
Figure 25:
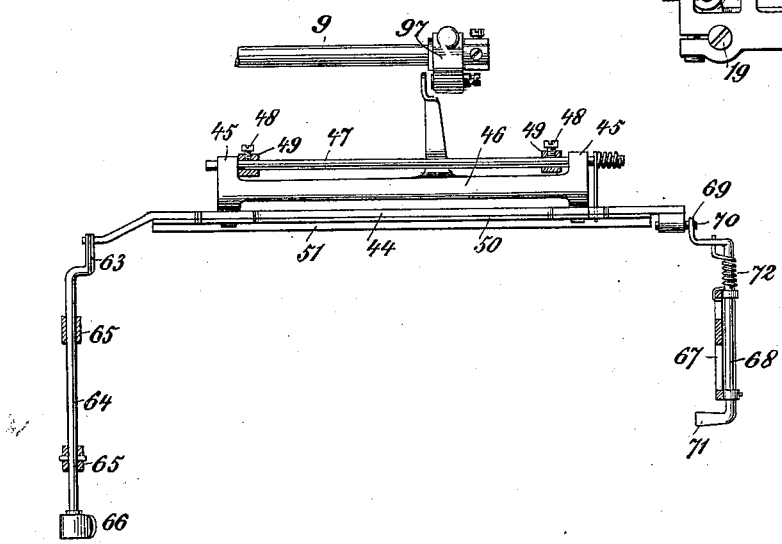

In the accompanying drawings, Figure 1 is a top plan view of a machine embodying my improvements, the paper-table and the keyboard or key-lever mechanism being omitted. Fig. 2 is a sectional elevation taken at the left-hand side of the machine and on the line *y y* of Fig. 6 with the carriages added. Fig. 3 is a detail perspective view of the cam-rotating latch-lever, which is shown also at Figs. 2, 4, and 6. Fig. 4 is a detail horizontal section taken on the plane represented by the dotted line *x* at Fig. 2 to show more particularly portions of the mechanism for moving the ribbon crosswise, the section extending from the cam-cylinder to the rear corner-post, and the latch-lever 170, above the plane of the section, being shown in dotted lines. Fig. 5 is a side view of the ribbon-moving cam with the long ribbon-driving shaft in section and showing also the head for holding the cam against endwise movement, the screw-stem of the head being in section. Fig. 6 is a top plan view to show more particularly the ribbon-moving mechanism, the carriage and platen-carrier, &c., being removed. Fig. 7 is a perspective view of the ribbon guide-plate and the mechanism for moving the same and the ribbon crosswise, the framework being omitted. Fig. 8 is a detail perspective view showing the mode of attaching the left-hand end of the ribbon guide-plate to the ribbon-spool-carrier guide-bar. Fig. 9 is an enlarged vertical section taken at the line *w w* of Fig. 6 and showing the mode of holding the front end of the ribbon-carrier guide-bar and showing also the left-hand end of the ribbon guide-plate attached to said bar. Fig. 10 is a plan or development of the ribbon-moving cam. Fig. 11 is an enlarged vertical section taken at the line *v v* of Fig. 6. Fig. 12 is a rear elevation, partly in section, of the carriage escapement or feeding mechanism, the rigid or holding dog being omitted and the view illustrating the action of the escapement-wheel on the feeding-dog during the return movement of the carriage. Fig. 13 is a perspective view of the feeding or loose dog and the antirattling device attached thereto, which is shown also at Fig. 12. Fig. 14 is a view somewhat similar to Fig. 12, but showing the escapement or ratchet wheel in two positions and the feeding-dog also in two positions. Fig. 15 is an enlarged section of the feeding-dog and part of the escapement-wheel, the view being taken at the line *u u* of Fig. 18. Fig. 16 is a top plan view of the escapement-dogs and their support. Fig. 17 shows in top plan and end views the escapement-dogs applied to a straight rack instead of a circular one. Fig. 18 is a vertical section taken at the line *t t* of Fig. 1 and with the ratchet or escapement wheel lifted to permit the releasement of the carriage from the dogs. Fig. 19 is a vertical section showing one of the paper-pressing bands, its supports, the paper finger or guard, the small paper-feed roll, and the adjustable bracket carrying all of said devices on the front bar of the platen-carrier. Fig. 20 is a front elevation of the same. Fig. 21 is a perspective view of one of the thin paper-pressing bands or devices thickened and enlarged. Fig. 22 is a detail side sectional view showing the mode of mounting the right-hand ribbon-spool. Fig. 23 is a partial side elevation taken at the right-hand side of the machine. Fig. 24 is a detail view to illustrate the action of the gravity-detent; and Fig. 25 is a plan skeleton or outline view of the feed-rack mechanism, the carriage-releasing mechanism, &c.

In order to simplify the drawings as much as possible, the keyboard and all other parts of the machine located beneath the dog holder or rocker have been omitted, as have also the type bars or levers.

I have shown my improvements embodied in that type of machines known as the "Remington Standard type-writer No. 6;" but they may of course be employed in machines of other make or construction.

In the various views the same parts will be found designated by the same numerals of reference.

The general upright framework of the machine is designated by the numeral 1, the top plate by 2, the carriage by 3, and the platen-carrier by 4.

The parts 3 and 4 constitute as a whole a paper-carriage; but for convenience of description the part 3, which has a traveling movement only, is designated as a "carriage," while the part 4, designated as a "platen-carrier," has a shifting movement independent of the carriage for upper-case printing and has also a lifting capacity for inspection and correction of the work and for adjustment of the paper. The carriage 3 is a comparatively narrow bar-like structure, having near each end grooved rollers 5, which travel upon the guide-rail 6, supported in lugs at each side of the top plate. About midway of the carriage is cast an arm 7, which extends rearwardly and is forked at its extremity to embrace a flanged collar 8, which slides upon an auxiliary guide-rod 9, secured at its ends upon additional lugs rising from the top plate. The carriage 3 is prevented from lifting from the guide-rail 6 by means of two hooks or fingers 10, attached to the rear vertical flange of the carriage by screws 11 and bent to extend down and under and in contact with said rail. Attached to the right-hand end of the carriage is one end of a driving band or belt 12, the other end of which is connected to a spring driving drum or wheel 13 of the usual construction and arrangement and by which the power is furnished to move the carriage and the platen-carrier toward the left.

In a horizontal bearing or perforation formed in the arm 7 is held by a set-screw 14 a rod 15, which is provided at its right-hand end with a pivoted combined bell-tripper and carriage-stop 16. This rod 15 is adjustable in its bearings, so as to give the alarm and stop the carriage at different points within the range of travel of the carriage. The dependent tripper 16 acts first upon the upper end of a pivoted bell-hammer arm 17 and then after the alarm is sounded strikes against a fixed part of the machine to arrest the forward movement of the carriage.

At the front side of the carriage 3 is a rock-shaft 18, pivoted at 19 at its ends in a forward extension of the carriage. At each end of this rock-shaft is a rocker-arm 20, which extends upwardly and forwardly to connect with the platen-carrier at its rear side. Each end of the platen-carrier is forked at the locality of the rocker-arm, so as to embrace the upper end of the latter and pivot or hinge thereto, the pivot-pin being extended at each end, as at 21, to play between two fixed stops 22 and 23, made in the form of screws. When the pins are against the stops 22, the platen-carrier is in its lower-case position, and when against the stops 23 it is in its upper-case position, the rocker-arms being adapted to vibrate about the centers 19 in these movements of the platen-carrier under the pushing and pulling movements of the usual shift-rod 24, upon which the grooved front roll 25 of the platen-carrier travels.

The platen-carrier consists, essentially, of a rectangular frame composed of a back rod 26, which is coincident with the pivots 21, a front bar 27, a left-hand side bar 28, and a right-hand side bar 29.

In suitable bearings in the side bars is mounted the platen-axle 30, which at each end is provided with a hand-wheel 31. The platen 32 is mounted upon said axle and is provided at its right-hand end with a ratchet-wheel 33, adapted to be engaged by the free end of a driving-pawl 34, pivoted at 35 on the upright end of a line-space lever 36, which is pivoted at 37 in upward extensions of the side bar 29 and is provided with a downwardly-extending portion 38. The platen is held normally against rotation during the printing operation by means of a small roller 39, mounted at the end of a spring 40, attached at its rear end to the under side of the fork of the side bar 29. The driving-pawl is normally out of engagement with the ratchet-wheel, and hence the platen may be turned freely in either direction by means of the handle 31.

The line-space lever (shown more clearly at Fig. 23) is provided with an inwardly-extending arm 41, having at its free end a tooth 42 to engage with the teeth of the ratchet-wheel during the line-spacing operation to prevent any overthrow of the platen when the line-space lever is violently actuated, and said arm 41 is provided with a downwardly-extending finger 43, which at certain times acts upon the carriage feeding or escapement mechanism, which may now be referred to.

The carriage is provided with a vertically-arranged feed-rack 44, which near each end is attached (see Fig. 25) by screws to downwardly-projecting curved arms 45, connected by a cross-bar 46 and pivoted or hinged at their rear upper ends upon a round rod 47, which is held fixedly by set-screws 48 in lugs or ears 49, extending down from the carriage 3 on its rear side.

On the front side of the feed-rack 44 is a bar 50, having a horizontal flange or ledge 51 and a vertical rib 52, which rests upon a roller 53, while the feed-rack meshes with a pinion 54, the said roller and pinion being arranged at the inner end of a shaft 55, which bears at its outer or rearmost end a ratchet or escapement wheel 56, firmly secured thereto by set-screws passing through a collar on the escapement-wheel and bearing at their points upon said shaft. This shaft has a bearing in a support or frame 57, which has a horizontal pivot at 58, in order that the said support or frame may be vibrated in a vertical plane for the purpose of lifting the escapement-wheel out of engagement with the escapement-dogs to be presently described. The pivot 58 passes through the support 57 and through forks or ears 59, projecting upwardly from a bracket 60, secured by screws 61 to the top plate of the machine. Upon the top of the bracket 60 is attached by screws a spring 62, the free end of which bears upon the top of the shaft-support 57 and serves to return it to its normal position when released.

The escapement-wheel and pinion-shaft 55, with its bearing or support, is tilted or vibrated to separate the escapement-wheel and the dog by either of two rock shafts or levers attached to the platen-carrier, the one at the left-hand side thereof being known as the "release-key" and the one at the right-hand side operating only in conjunction with the line-space lever.

The feed-rack at its left-hand end is extended, as shown at Fig. 25, beneath a finger 63 at the end of a rock-shaft 64, having bearings in arms 65, depending from the left-hand side bar 28, and provided at its front end with a finger-piece 66. When this finger-piece is vibrated toward the right and pushed down, the finger 63 is depressed and bearing, as it does, upon the feed-rack the latter is caused to swing down about its axis of motion 47, and in its swinging movement, through its engagement with the pinion, to tilt or vibrate the shaft 55 and cause the escapement-wheel to rise above the plane of the escapement-dog or to the position shown at Fig. 18. When the release-key 64 is thus actuated and the escapement-dog lifted, the carriage and platen-carrier may be moved quickly in either direction by the hand toward the right or by the spring driving power toward the left.

On the right-hand side of the platen-carrier is mounted in bearings in a bracket 67, depending from the side bar 29, another rock-shaft 68, the inner finger 69 of which overlies a pin 70 at the right-hand end of the feed-rack, while the outer finger 71 of said rock-shaft inclines upwardly and terminates in the path of movement of the downwardly-extending finger 43 of the line-space lever, so that when said lever is vibrated to effect the line-spacing of the platen simultaneously with the return movement of the carriage for the beginning of a new line the said rock-shaft is turned, and through the connections described the escapement-wheel is lifted or disengaged from the escapement-dog. The rock-shaft 68 is preferably provided with a separate returning-spring 72.

The rack and pinion are maintained in engagement at all times by the gravity of the rack and its frame, which engagement is insured, however, by means of a pivoted hook 73, which clasps the upper side of the horizontal flange or ledge 51 of the bar 50, attached to the face of the feed-rack. The said hook is pivoted in a bearing at the forward end of a bracket 74, fastened on the innermost end of the pivotal frame or support 57.

Pivoted at 75 in a part of the framework is a dog holder or rocker 76, which is in the form of an arm and, extending upwardly, bears at its free end the rigid or holding dog 77 and the yielding or feeding dog 78, whose working face is parallel to the plane in which the said dog moves. At the axis of the dog-holder is arranged a returning-spring 79 of the usual construction and arrangement, and from said axis projects inwardly an arm 80, to a cross-bar 81 of which are attached at each end the wires or rods by which the universal bar is arranged beneath the key-levers, common in prior machines and not necessary to be further explained herein.

The dog holder or rocker 76 is provided with an adjustable stop 82 on a screw-stem, by which the forward vibrations of said holder or rocker are limited. The upper end of the dog-holder is formed with a rearwardly-extending ear 83, to which is attached by a screw 84 the rigid dog 77. This dog consists, essentially, of a small flat plate, the upper end of which has a beveled, offset, or inclined portion or tooth 85 and a straight portion or tooth 86, the latter being parallel with the sides of the plate and the former bent at an angle thereto and toward the right, viewed from the front of the machine. This offset, bent, or angular portion 85, in connection with the escapement-wheel, (or rack,) effects a quick releasement and feed of the carriage, as will be hereinafter more fully explained. The loose or flexible dog 78 is pivoted at 87 upon the said rocker or holder and is formed with two flat shoulders or faces 88 and 89, one above and one below the said pivot 87. Bearing upon these faces 88 and 89 is a spring 90, curved or hook-shaped at its upper end, as at 91, and secured to the rocker at its lower end by a screw 92. When the escapement-wheel is raised, the hook-shaped end of the spring presses against both of the faces 88 and 89 and causes the beveled or working end of the dog to stand in the position shown by the full lines at Fig. 15, which position is a central or intermediate one, the dog being adapted to move to either of the two dotted-line positions, also shown at said figure. When the dog is moved to the dotted-line position $a$, the pressure of the spring upon the face 88 is removed, and hence when the dog is released from this position the upper end of the spring acting upon the face 89 returns the dog to the full-line or intermediate position, at which the spring bears upon both of the said faces, serving thereby as a stop to the movement of the dog and to centralize the same. When the dog is moved to the dotted-line position $b$, the upper face 89 is swung away from the upper end of the spring, so that when the dog is thereafter released the spring acting upon the face 88 will serve to return the dog to its central normal position again. The dog is moved to and from its two dotted-line positions by the means and in the manner to be presently explained.

Upon the left-hand side of the dog 78, viewed from the front of the machine, is attached by a screw 93 an arm 94, which extends first upwardly and then sidewise toward the right, the active portion 95 of said arm being arranged to contact with the front face or side of the body of the escapement-wheel 56, as indicated at Figs. 12 and 14, when said ratchet-wheel is down or in its working position.

The operation of the escapement devices will now be more particularly described. Normally or when the machine is in disuse the loose spring-pressed feeding-dog 78 stands in engagement with the escapement-wheel, which, under the driving power and through the intermediate rack and pinion, has a tendency to rotate in the direction of the arrow at Fig. 14; but said rotation is prevented at this time by reason of the right-hand side of the dog bearing against a stop 96, forming part of the rocker. When the finger-key connected with a type-bar or the spacing mechanism is actuated, the dog 78 is rocked forward out of the plane of the escapement-wheel and the rigid dog 77 is by the same operation moved into the plane of said wheel and into the space between two of its teeth to check the rotation of said wheel and prevent any movement at this time of the paper-carriage. As soon as the feeding-dog 78 passes out of the escapement-wheel its spring 90 operates to vibrate said dog toward the left, or into the intermediate position shown by the full lines at Figs. 14 and 15. When said finger-key is released, the dog 78 passes into the next space or notch of the escapement-wheel, and as the rigid dog moves back out of engagement with said wheel the latter being unrestrained, may make a partial rotation in the direction of the arrow at Fig. 14, during which the dog 78 is vibrated toward the right and against its stop 96, while simultaneously the carriage is moved or fed through the rack and pinion one letter-space distance. In the forward rocking movement of the dogs the point of the beveled or inclined portion 85 of the rigid dog passes into the space between two teeth of the escapement-wheel without touching either of said teeth, the contact of the escapement-wheel or tooth taking place at about the junction of the beveled portion 85 and the straight portion 86 of said dog. In the returning rocking movement of said dogs as soon as the rigid dog starts to part company with the tooth of the escapement-wheel which it restrains said tooth is instantly partially relieved of resistance, and during the entire movement of the rigid dog from the escapement-wheel said wheel, owing to the bevel of the dog, is enabled to continue its rotative movement until the point of the dog passes away from the wheel. During this retraction of the rigid dog the vibratory feeding-dog is passing into engagement with the ratchet-wheel, but into a notch or space behind that which the rigid dog is passing out of, and as soon as the outward or backward movement of the rigid dog is completed the ratchet-wheel is free to complete its letter-spacing rotative movement, during which the feeding-dog 78 is carried by said wheel toward the right and against its back-stop 96. From this construction and mode of operation it will be observed that in consequence of the beveled or inclined dog the carriage-feeding devices may operate partially during the backward movement of the rigid dog, and hence afford a partial feed at this time to the paper-carriage. For this reason more time is given to the paper-carriage to move a full letter-space than in prior machines, the movement of the carriage in this machine commencing immediately upon the removal of the pressure from the operating-key, while in the prior machines this movement of the carriage commenced only after the rigid dog had entirely left the rack and the type-bars and finger-keys had moved considerably back to their normal positions. The effect of releasing the carriage to commence its feeding movement the instant the pressure upon the actuating-key is removed is to give to the carriage more time to pass from one letter-space to the next, and in rapid writing the carriage may move its full letter-space distance and come to rest without any undue vibration before the next type reaches the paper on the platen, and for this reason the side alinement or spacing of the writing is greatly improved. In writing at a very high speed the beveled portion of the dog, which moves very rapidly, may be swung out of the ratchet-wheel before the tooth which it resisted has time to follow the dog; but in this case, as in slow writing, the wheel commences to turn and the carriage commences its feeding movement simultaneously with the backward movement of the beveled dog, which backward movement of course commences at the initial upward movement of the key and at the start of the rebound movement of the type-bar. Hence either in slow or in rapid writing the carriage is released or enabled to commence its feeding movement at an earlier period than in machines having a holding-dog not provided with a beveled portion. The advantage of this is clear when it is borne in mind that the carriage and its attachments are of considerable weight and require some appreciable time for their inertia to be overcome and for their vibration to cease after the completion of such letter-spacing movement. The arm 94 is provided for the purpose of preventing the pivoted dog 78 from rattling and making a noise during the return movement or movement toward the right of the carriage when such movement is effected without raising the escapement-wheel. It will be seen, of course, that if the escapement-wheel be not raised and the arm 94 were omitted the escapement-wheel in rotating rapidly would contact with the top of the dog 78 and cause it to vibrate rapidly and emit a clicking or rattling sound, which is objectionable for this reason and also on account of the undue wear which would fall upon the dogs and upon the teeth of the escapement-wheel. To avoid these objections, the said arm 94 is provided, and its mode of operation is as follows: When the carriage is returned or moved toward the right, as indicated by the straight arrow at Fig. 12, the escapement-wheel, through the rack and pinion and the shaft, is rotated in the direction shown by the curved arrow at said figure, and owing to the contact of the free end 95 of the said arm 94 with the side of the escapement-wheel the arm is carried with said wheel by friction for a short distance and sufficiently to cause it to move the dog 78 about its pivot and to the position shown at Fig. 12 in full lines and to the position shown at b at Fig. 15 in dotted lines; or, in other words, by this action the point of the dog 78 is carried down and below the plane of rotation of the points of the teeth of the escapement-wheel, and hence during the rotation of said wheel its teeth fail to contact with said dog, thus permitting the carriage to be returned noiselessly and without wear on the dog or teeth. As soon as the dog is vibrated downwardly enough to clear the teeth of the escapement-wheel its motion ceases and it is held in its depressed position by the friction of the arm against the side of the escapement-wheel, this friction or pressure being obtained by the rocker-spring 79. As soon as the rightward pull on the carriage is released the driving power of the carriage moves it slightly in the reverse direction, or toward the left, thus giving the escapement-wheel a partial rotation in the reverse direction, which operates to carry the arm 94 toward the right and bring the dog 78 back to its normal position against the stop 96, which return movement of the dog is assisted some by the spring 90. It will be observed when the escapement-wheel is raised from engagement with the dog 78 by means either of the release-key or the line-spacing lever through the connections hereinbefore described that owing to the removal of the lateral or side pressure upon said dog by said wheel, due to the driving power, the spring 90 of the dog acts to vibrate said dog toward the left and to the said intermediate position, and hence when the carriage is stopped and the hand is removed from the release-key or the line-space lever, as the case may be, the escapement-wheel will drop down into engagement with the said dog while in the central position, but will instantly carry said dog back against its stop 96, owing to the partial revolution of the escapement-wheel under the force of the main spring or driving power, thus feeding the carriage at this moment one letter-space. It will be understood, of course, that the escapement-wheel is raised whenever the pinion and feed-rack are depressed and that the latter may be moved down by either the release-key 64 or by the rock shaft or lever 68 when actuated by the finger 43 on the line-space lever, when the lever is moved to rotate the platen simultaneously with the return movement of the carriage for the beginning of a new line. The said returning movement of the carriage may be arrested at any desired point by an adjustable margin stop contrivance 97.

My several improvements in or upon the platen-carrier will now be described.

98 is the shaft or axis of the feed-roller 99, which may be made in sections and to protrude through openings in a metallic apron or guide-plate 100, secured at its upper end to a rocking rod 101, extending across the platen-carrier and attached to the side bars thereof by screw pivots or centers 102 at its ends, the said apron or guide-plate being preferably provided at its lower edge with a pressure-bar 103, which may be graduated and marked to form a scale corresponding with the letter-spacing of the carriage. The feed-roller axis or shaft is supported in bearings in the lower ends of arms or links 104, which are pivoted at 105 in ears 106 on the back rod 26. On the under side of each arm is attached by a screw 107 a flat spring 108, which bears at its upper end against a lug on the back rod 26, and which terminates at its lower end at near the pressure or scale bar 103. The purpose of these springs is to hold the feed-roller against the platen or the paper thereon with the requisite degree of pressure.

On the upper side of each arm 104 is a pin 109, and opposite thereto on the rocking shaft 101 is a wing or lug 110, while at the left-hand end of said shaft is affixed a handle or lever 111, having a rearward extension 112, adapted to bear against the under side of one of the forks at the rear end of the left-hand end bar 28. When the handle is pushed rearwardly, the shaft 101 is rocked, and by means of the wings acting upon the pins the arms 104 are vibrated slightly rearwardly against the tension of their springs and the feed-roller is moved away from the platen or the paper thereon, as indicated by the dotted lines at Fig. 18. By this construction provision is made for the easy introduction and removal of the paper, as well as for its adjustment in any direction when upon the platen, the casting off of the feed-roller leaving the paper free or loose upon the platen.

In order to prevent any backward movement of the platen during adjustments of the paper thereon, a detent or dog 113 is employed. (See Fig. 18.) This device is provided with a short sleeve or bearing 114, which is pivoted upon the rocking shaft 101, and is also provided with a forwardly-extending arm 115, having at its front end a finger-piece 116. The weight of the arm and finger-piece operates to maintain the detent normally out of engagement with the platen ratchet-wheel 33 when the platen is down and in working position, and hence at such time the platen may be freely rotated either forward or backward; but when the platen is turned up for adjustment of the paper the arm and finger-piece fall on the rearward side of the rocking shaft 101 or fall on the other side of the pivot of the detent and by their weight cause the detent to move toward and engage with the ratchet-wheel, the detent and the arm forming together a bell-crank-shaped device. When the detent engages with the ratchet-wheel, the platen is prevented from turning backwardly, and hence the sheet upon the platen may be pulled backwardly thereupon without effecting at the same time the rotation of the platen, which should remain at rest. This detent may be used with or without a cast-off feed-roller. It moves automatically into and out of engagement with the ratchet-wheel as the platen is turned up and down. If while the platen is in its turned-up position it should be desired to turn the platen backwardly, the detent may be disengaged from the ratchet-wheel by pressing the finger-piece 116 toward the side bar upon which it rests when the platen is down, and this operation will swing the detent away from the teeth of the ratchet-wheel, and thus free the platen for backward rotation; but as soon as the finger-piece is released the gravity thereof and the arm will cause the detent to reëngage the ratchet-wheel again at once and remain in such engagement until the turning-down movement of the platen takes place, when the weight of the arm and the finger-piece will fall on the front side of the pivot, and the detent will thereby be moved away from the ratchet-wheel again.

Near each end of the front bar 27 of the platen carrier or frame is a clamp or holder of special construction and carrying a small feed-roll, a paper finger or guide, and a paper band, presser, or clasp.

Referring more particularly to Figs. 1, 19, 20, and 21, 117 is a bracket having a horizontal portion, (which rests upon the top of the T-shaped bar 27,) an upwardly-projecting portion, and a downwardly-projecting portion. The upwardly-projecting portion is notched at its upper edge to receive the upper edge of a clamping-plate 118, the lower edge of which passes under the head of the bar 27. A screw 119 passes through a hole in said plate and enters a threaded aperture in the upright portion of the bracket, whereby the bracket is retained in position upon said bar. A shoulder 120 on the shank of the screw limits the turning-in movement of the screw. A spring 121 between the head of the screw and the face of the plate is provided to press upon said plate and enable it to clamp the bracket and the rail with a yielding force or pressure, so that the contrivance as a whole may be readily slid lengthwise upon the bar 27 and be frictionally held at any desired position thereupon, the plate yielding slightly to any inequalities or irregularities in the bar, the shoulder 122 upon the screw in front of the plate being normally out of contact therewith, so as to allow for this slight yielding movement of the plate. The downwardly-extending portion of the bracket is hollowed out to receive a spring-pressed pin or plunger 123, that acts upon either of two flat faces 124 at the upper end of a roll holder or frame 125, which is pivoted at 126 at the lowermost end of said bracket. This holder or frame is forked to receive a small roll 127, mounted to turn freely on an axis therein. This roll is provided with a handle 128, by which it may be conveniently moved into either of two positions, both of which are indicated at Fig. 19.

Attached by a screw to the horizontal portion of the bracket is a narrow plate or stiff finger 129, which is curved to conform substantially to the curvature of the platen and which terminates at its lower inner end at about the locality of the paper-scale or pressure-bar 103, which it preferably overlaps. This curved finger or guide 129 is cut away or slotted at a point opposite the roll 127 to permit said roll to pass therethrough and into contact with the paper on the platen. These rolls 127 at the ends are employed more particularly to maintain the paper firmly upon the platen when it may be desired to write close down to the bottom end of the sheet and when the tail end of the sheet has passed out of the bite of the main feed-roller 99; but these rolls are also employed to advantage in writing upon envelops, cards, and other stiff materials. When these rolls are not to be used, they may be swung outwardly to the dotted-line position shown at Fig. 19, at which they will be held by the spring-pressed pin 123, bearing upon the outer flat face of the roll holder or frame, the roll being also held by said pin in its working position by pressing upon the inner face of the roll-holder, as shown by the full lines at Fig. 19.

For the purpose of having the paper conform exactly to the surface of the cylinder or platen and for retaining it in contact therewith over a large surface a band or presser 130 is employed at each bracket. The band or presser is made of very thin sheet metal and is fastened at its lower end to the lower free end of the heavier sheet-metal finger 129, while at its upper end the said band or presser is pivotally connected at 131 to an arm or holder 132, which is pivoted at 133 in the upper portion of the bracket.

On the under side of the arm or holder 132 is a small coiled spring 134, which acts to press said arm or holder upwardly and to cause the major part of the band or presser to conform to and hug the lower forward section or quadrant of the platen, as shown clearly at Fig. 19. When the paper is introduced, the said band or presser accommodates itself in like manner to the surface of the paper on account of its thinness and flexibility and the hinging of the arm or lever, which latter may descend slightly as the paper is added to the platen. This construction has been found in practice to be extremely desirable, particularly where envelops or several thicknesses of paper are to be written upon. The band acts automatically upon the paper, whatever may be the thickness or number of sheets, and operates, as explained, to cause the material to be properly conformed or shaped to the cylinder in the vicinity of the impression-plane, where it is most desirable that there shall be no buckle or bulge of the paper, which, particularly in machines having two types upon a bar, results in the production of blurred or offset work above the line of writing when the upper-case letters are impressed. This band or presser (shown at Fig. 21 thicker than it really is in practice) is formed with a slot or opening 135 to permit the protrusion therethrough of the roll 127 when said roll is used. These spring bands or pressers, being connected to the slidable brackets or clamps hereinbefore described, may in consequence be adjusted to and set at various points along the front bar of the platen-carrier to subserve their purposes with narrow paper and short envelops, &c. These bands or pressers may, however, be permanently located at the ends of the platen-carrier front bar and at intermediate points, if desired.

At the center of the platen-carrier front bar is arranged another bracket or clamp. (Shown more particularly at Figs. 1 and 18.) This bracket or clamp while set normally at a central position upon said rail is nevertheless adapted to be moved endwise thereupon, since the means for holding it are somewhat similar to the means for holding the end brackets.

Referring to Fig. 18, the center bracket is designated in its entirety by the numeral 136. It rests upon the top bar and is provided with a lip 137, which engages with the under side of the head of the bar in opposition to the lip at the lower side of the clamping-plate 138, the upper end of which is seated in a recess in the top of the bracket. The clamping-plate is held yieldingly to the bracket by means of a spring 139 in connection with a shouldered screw 140, such as hereinbefore described with reference to the end brackets.

In ears 141, projecting rearwardly from the body of the bracket, is pivoted at 142 a paper-guide 143, which is curved at its lower end to match substantially the curvature of the platen and which projects at its upper end to form a finger-piece, whereby the guide may be vibrated or moved to and from the platen. The guide is provided with a lug 145, having two flat faces adapted to be acted upon by a spring-pressed pin 146 in an aperture in the body of the bracket, as shown clearly at Fig. 18, in which view the spring-pressed pin is acting to hold the lower end of the paper-guide against the platen. When the upper end of this guide is pushed rearwardly, the lower end is swung away from the platen and the lower face of the lug is moved up in front of the pin 146, which then acts to hold said guide away from the platen. This guide preferably carries at its lower end a small roll 147, which may be employed to assist in the feeding of the paper, envelops, or the like.

The means for feeding the inking-ribbon will now be described in connection with its associated devices. The inking-ribbon 148 is attached at its ends to two spools 149, (see Figs. 2 and 6,) one at each side of the machine. These spools are splined upon their shafts 150 and 151, so as to rotate therewith and also to slide endwise or longitudinally thereupon. The shaft 150 is provided at its rear end with a bevel-gear 152 and the shaft 151 with a bevel-gear 153. A bevel-gear 154 upon a long driving-shaft 155 is adapted to mesh with the bevel-gear 152 and rotate the shaft 150 and the spool thereupon, while a bevel-gear 156 at the right-hand end of the shaft 155 is adapted to mesh with the bevel-gear 153 and rotate the shaft 151 and its spool thereupon. The said shafts 150 and 151 are adapted to be alternately rotated, so that the ribbon may wind first upon one spool and then upon the other, and for this purpose the shaft 155 is movable lengthwise or endwise, so as to first put the gears 152 and 154 in mesh and then the gears 153 and 156 in mesh, and so on alternately, the main driving-shaft sliding in suitable bearings in the framework. Upon the shaft 155 is mounted a bevel-gear 157, which is engaged at all times by a bevel-gear 158 on the axis of the spring driving-drum 13, to which is attached at one end the driving-band 12, the other end of which is attached to the paper-carriage. When the carriage moves forward or toward the left, the shaft 155 revolves, and at the same time either one of the spool-shafts 150 or 151 is driven, depending, of course, upon which set of bevel-gears is in mesh or engagement. The right-hand spool-shaft bearings are preferably made in two parts for convenience of detachment of the spools, one part of the bearing being cast in the hanger and the other part being formed in a spring-pressed hook, as shown at Figs. 18 and 22. This arrangement of shafts and gearing for rotating the ribbon-spools and moving the ribbon lengthwise from one spool onto the other is that commonly employed in the well-known "Remington" machine.

The present improvements relate to means for moving the ribbon crosswise or in the direction of its width, and this movement is preferably made during the sliding or longitudinal movement of the main driving-shaft 155 to alternately rotate the spools.

Mounted upon the main driving-shaft 155 near its left-hand end is a cylinder 159, Fig. 4, having a double cam-groove 160 formed about its periphery and having on its left-hand side or face a series of notches or teeth 161. This cam-cylinder or cam is provided with a flange 162 at the end of a short neck 163, and between said flange and the side or face of the cam is arranged the head 164 of a screw-bolt 165, fastened by a nut to a bracket 166, which is attached to the framework by screws 167 and 168. The head 164 is provided to prevent the cam from moving endwise upon the shaft 155, which latter passes through a perforation in the inner end of the bracket 166 and at its protruding end is provided with a crank-handle 169. A lever 170 is pivoted upon the plain portion of the screw 168 and at its rear end is forked or notched, as at 171, to receive a pin 172 in the framework, which pin, in connection with the notch 171, serves to limit the up-and-down vibration of the lever 170, which at its inner or forward end is provided with a handle 173. Between its ends the lever 170 is provided with a downwardly-extending fork 174 to straddle the shaft 155 and enter reduced portions or grooves 175 and 176 thereon. When the fork 174 is in engagement with either of said grooves, the shaft 155 is prevented from moving endwise or longitudinally.

Upon the lever 170 is pivoted at 177 a pawl 178, having a toe-piece 179, passing through a hole in said lever and adapted to engage successively with the series of notches or teeth 161 on the cam. The said pawl 178 is provided with a spring 180 to hold the point or toe of the pawl normally in engagement with one of said notches or teeth. By this construction when the lever 170 is pulled down the pawl will partially rotate the cam, and this through the mechanism now to be described will effect a crosswise movement of the ribbon-spools and ribbon; but to prevent any overthrow or undue movement of the cam in case the lever should be violently depressed a detent or dog 181 engages with said notches or teeth 161 to check the movement, the said detent or dog being mounted at the free end of a spring 182, which permits the detent to leave its notch when the lever is depressed, but which forces or snaps it into the next notch immediately it comes into alinement with the detent.

Arranged within the cam-groove 160 is a small roller 183, at the lower end of a vertical pin 184, supported in arms 185 and 186, connected together. The arm 185 is pivoted upon a journal 187 and is prevented from dropping therefrom by the head of a screw 188, whose shank enters said journal. The journal is vertically arranged in a tubular projection 189, extending downwardly, and said journal is provided at its upper end with a supporting head or flange 190. As the cam rotates, the arm 185 is vibrated about the pivot 187, and this motion is communicated to a horizontal lever 191, pivoted at 192 on the under side of the top plate. This lever 191 is formed with a cam-slot 193, in which plays or works a small roller 194 at the upper end of the pin 184. The inner end of the lever 191 is attached by a pin-and-slot connection 195 to a bar 196, Fig. 7, attached to or forming a part of the ribbon-spool carrier at the left-hand side of the machine, which consists of two downwardly-projecting arms 197 and 198, connected together by an integral cross-arm 199. The upper ends of the arms 197 and 198 have holes or perforations to permit them to slide upon a rod 200, supported at its ends by pointed screws 201, passing through brackets 202, which brackets at their lower ends support the ribbon-spool shaft 150. This rod 200 has a flat side 203, and at its outer end is provided with a head or flange 204, which has two notches 205, that are engaged by a bend formed in a flat spring 206, whereby the said rod is prevented from accidentally turning. The arms 197 and 198 of the ribbon-spool carrier embrace the heads or flanges of the ribbon-spool on the left, and the arm 197 is made, preferably, longer than the other arm and forked at its lowermost end to straddle the shaft 150, and thereby prevent the ribbon-spool carrier from turning and to serve at the same time as a guide therefor in its sliding movements upon the rod 200.

207 designates as a whole the ribbon guide plate or arm, which at its left-hand end is provided with a hook or bent portion 208, Fig. 8, of a length preferably equal to the distance between the arms 197 and 198 and adapted to clasp or embrace the rod 200. This hook-like part 208 is formed with a spring-tongue 209, which acts as a sort of spring-catch to hold this end of the guide-plate in proper position. The opposite or right-hand end of the guide-plate is provided with a fork or two downwardly-extending arms or fingers 210, which embrace the heads or flanges of the right-hand spool. Between its ends the guide-plate is cut away, as at 211, for the passage of the types, and on either side of this cut-away is a ribbon-supporting arm or finger 212, attached to the under side of the plate. Between these fingers and the ends of the guide-plate are a series of slots 213, which show the passage of the ribbon thereunder. The guide-plate may be swung upwardly with the rod 200 as a center of motion for the purpose of cleaning the types, making repairs, &c., and in swinging the plate to its upturned position the rod 200 turns partially about its pivots or screws, and in turning the swell or projection of the spring 206 is forced out of the lowermost notch 205 and springs into the notch behind as the latter comes around, so as to frictionally hold the said rod and maintain the ribbon-plate in its upright position. One side of the rod being flat, the ribbon-plate is prevented from turning independently upon said rod. When the plate is turned down to working position, the rod 200 turns slightly in the opposite direction and the spring engages with the first notch again to hold the rod. The ribbon having been attached at one end, say, to the left-hand spool is wound thereupon, and the loose end of the ribbon is then passed through the slot or opening 214 in the top plate, over the hook 208, then down through a slot 215 in the guide-plate, thence under the guide-plate, thence over the left-hand finger, which is free at one end to permit the ribbon to be passed laterally over the same, then past the opening 211, thence over the right-hand finger 212, which is likewise free at one end, thence along under the right-hand half of the guide-plate to and through the wire loop 216, and thence downwardly to the right-hand spool and fastened thereat. This threading or attachment of the ribbon to the guide-plate is done before the guide-plate is placed in working position. After the threading operation the hook 208 is sprung upon the rod 200 and the arms or fingers 210 are set astride the right-hand ribbon-spool.

As the writing is performed with the parts in the positions shown at Fig. 6, the ribbon will be wound step by step upon the left-hand ribbon-spool, and when this spool is full the direction of movement of the ribbon must be reversed, and this is accomplished by sliding the driving-shaft 155 toward the right, so as to engage the bevel-gears 153 and 156 and disengage the gears 152 and 154; but before this longitudinal movement of the driving-shaft 155 can be effected the lever 170, whose fork 174 latches said shaft, must be raised to unlock said shaft, which may then be moved freely endwise, or so that the groove 176 may be moved inwardly into the plane of vibration of the fork 174. When this movement is made, the lever 170 may be pulled down, so that the fork 174 may engage with the groove 176, and thus lock the sliding driving-shaft 155 against accidental endwise movement and maintain the right-hand gears 153 and 156 in working engagement. This downward movement of the lever 170 or latching operation of the driving-shaft 155 effects simultaneously a partial transverse or crosswise movement of the inking-ribbon through the mechanism hereinbefore described and whose operation will now be more particularly explained.

When the lever 170 is pulled down, the pawl 178, which is always in engagement with one of the notches or teeth in the cam, operates to turn said cam a distance proportionate to its throw or vibration, or the distance from one tooth or notch 161 to the next. This turning movement of the cam, through the roller in the groove 160 and pin 184, effects a vibration of the pivoted arm 185, and this vibration, through the roller 194 and cam-slot 193, effects a vibration of the lever 191, and the movement of this lever in turn effects an endwise movement of the arm 196 and the ribbon-spool carrier, and through the guide-plate and its connection to the right-hand spool the ribbon is moved transversely, or in the direction of its width, so as to bring a new field or portion thereof into use. When the ribbon is all wound upon the right-hand spool, the driving-shaft 155 is pulled endwise toward the left after the lever 170 has been raised to disengage the right-hand-spool gears and reëngage the left-hand-spool gears, and when said lever 170 is again depressed to relatch the said shaft 155 the cam is turned the distance of another notch, and through the intermediate mechanism described the ribbon is moved widthwise another step, so as to bring still another field or portion thereof into the plane of the impression-point. In this manner the ribbon is moved a step crosswise each time the shaft 155 is moved longitudinally, or, in other words, each time the direction of longitudinal travel of the ribbon is reversed. The mechanism is preferably constructed to move the ribbon crosswise five successive steps in one direction and then five successive steps in the opposite direction, there being ten notches or teeth upon the cam; but the mechanism may be so changed as that the ribbon shall be moved a greater or smaller number of steps crosswise, if desired. By reason of the construction and arrangement of this mechanism for moving the ribbon crosswise little or no attention is required on the part of the operator, since the movements are effected automatically by the mere reversal of the longitudinal movement of the ribbon, and as a result of this mechanism the ribbon may be utilized over its entire surface, thereby yielding an infinitely-greater number of impressions before becoming worn out or exhausted than is the case with ribbons which have no automatic crosswise movement and where dependence is had upon the attention of the operator to move the ribbon widthwise by hand. It will be observed that the plate is horizontally arranged over the top plate, serves to connect the two spools, slides bodily, and guides, carries, and shields the horizontal portion of the ribbon.

Referring to Fig. 17, it will be seen that I have illustrated my improvement relating to the beveled or bent dog in connection with a straight rack in lieu of a circular one, as shown in the remaining views, and from this figure it will be understood that the said dog is adapted to coöperate with the straight rack in substantially the same manner and to produce the same effects as with a circular rack or escapement-wheel, and for this reason I do not wish to be restricted in this part of my invention to the use of such a dog in conjunction with an escapement-wheel or circular rack.

Various changes in detail construction and arrangement may be made without departing from the gist of my several inventions, and as far as some of them are concerned they may be employed in connection with mechanisms different from those shown herein, and in machines constructed on plans quite dissimilar from the Remington machine, in which latter, however, my improvements have all been embodied in practice.

What I claim as new, and desire to secure by Letters Patent, is—

1. In a type-writing machine, the combination with a power-driven paper-carriage and escapement-rack, substantially as described, of a holding-dog having a working face arranged at an angle to the plane of movement of the dog and adapted to coöperate with the carriage and the rack, so as to enable them to commence their letter-space movement at the commencement of the return movement of the dog and the type, and a feeding-dog having its entire working face at right angles to the line of motion of the rack or parallel to the plane in which the dog moves, substantially as set forth.

2. In a type-writing machine, the combination of a power-driven paper-carriage, an escapement-rack, substantially as described, a pivoted or flexible feeding-dog having its entire working face parallel to the plane in which it moves or at right angles to the line of motion of the rack, and a holding-dog having a working face arranged at an angle to the plane in which the dog moves and adapted to free the rack and carriage so as to enable them to commence their letter-space movement at the commencement of the return movement of the dog and the type, substantially as set forth.

3. In a type-writing machine, the combination of a power-driven paper-carriage, an escapement-wheel operatively connected to the paper-carriage, a feeding-dog having its entire working face parallel to the plane of its movement or at right angles to the line of motion of the wheel, and a holding-dog having a working face arranged at an angle to the plane of movement of the dog and adapted to release the carriage at the commencement of the return movement of the dog, substantially as set forth.

4. In a type-writing machine, the combination of a power-driven paper-carriage having a feed-rack, a cross-shaft having a pinion at one end to gear with said rack, an escapement-wheel at the opposite end, a feeding-dog whose entire working face is parallel to its plane of movement or at right angles to the line of motion of the wheel, and a holding-dog having a working face arranged at an angle to the plane of movement of the dog and adapted to release the carriage at the commencement of the return movement of the dog, substantially as set forth.

5. In a type-writing machine, the combination of a power-driven paper-carriage, a feed-rack, substantially as described, a feeding-dog whose entire working face is parallel to its plane of movement or at right angles to the line of motion of the rack, and a holding-dog having a detaining portion and also a lateral or offset portion arranged at an angle to the plane of movement of the dog, whereby the rack and carriage may be partially moved during the return movement of the holding-dog and while it is still in the plane of said rack, and whereby the rack and carriage may complete their letter-spacing movement when the holding-dog entirely leaves said rack and the feeding-dog comes into engagement therewith, substantially as set forth.

6. In a type-writing machine, the combination of a power-driven paper-carriage, a feed-rack, substantially as described, a vibratory dog-holder carrying a spring-actuated feed-dog whose entire working face is parallel to its plane of movement or at right angles to the line of motion of said rack, and a holding-dog having a lateral or offset portion arranged at an angle to the plane of movement of said dog to permit the carriage to commence its letter-space movement simultaneously with the commencement of the return movement of said dog, substantially as set forth.

7. In a type-writing machine, the combination of a power-driven paper-carriage, a feed-rack, substantially as described, a vibratory dog-holder carrying a pivoted and spring-actuated feed-dog whose entire working face is parallel to its plane of movement or at right angles to the line of motion of said rack, and a holding-dog having a straight portion and a lateral or offset portion arranged at an angle to the plane of movement of said dog to engage with said rack and adapted to permit the carriage to commence its letter-space movement simultaneously with the commencement of the return movement of said dog, substantially as set forth.

8. In a type-writing machine, the combination of a power-driven paper-carriage, an escapement-wheel, a holding-dog, and a spring-pressed feeding-dog provided with a device adapted to contact with the escapement-wheel during the return movement of the carriage and by such contact move and hold the feeding-dog out of engagement with the escapement-wheel during such time, substantially as described.

9. In a type-writing machine, the combination of a power-driven paper-carriage, an escapement-wheel, a holding-dog, and a pivoted spring-actuated feeding-dog provided with an arm adapted to contact with the side of the escapement-wheel, substantially as described.

10. In a type-writing machine, the combination of a power-driven paper-carriage, an escapement-wheel, a holding-dog, a feeding-dog having a central normal position and adapted to be moved to either side thereof, and a friction device upon said feeding-dog adapted to engage with the side of the escapement-wheel during the return movement of the carriage, substantially as described.

11. In a type-writing machine, the combination of a power-driven paper-carriage, an escapement-wheel, a holding-dog, a pivoted feeding-dog having two faces and a spring adapted to bear thereupon, and an arm mounted upon said feeding-dog and adapted to engage with the escapement-wheel during the return movement of the carriage, substantially as described.

12. In a type-writing machine, the combination of a power-driven paper-carriage, an escapement-wheel, a holding-dog, and a feeding-dog provided with a friction device adapted to contact with a rotative surface connected to the paper-carriage and during the return movement thereof, as and for the purpose described.

13. In a type-writing machine, the combination of a turn-up platen, a platen ratchet-wheel, and a detent adapted to automatically engage said ratchet-wheel during the turning-up movement of the platen and to automatically disengage itself therefrom during the turning-down movement of said platen, substantially as described.

14. In a type-writing machine, the combination of a turn-up platen, a platen ratchet-wheel, a pivoted detent having a weight to maintain it out of engagement with the ratchet-wheel when the platen is down and to cause the detent to automatically engage with said ratchet-wheel when the platen is turned up, substantially as described.

15. In a type-writing machine, the combination of a turn-up platen, a platen ratchet-wheel, a pivoted detent having a weight to maintain it out of engagement with the ratchet-wheel when the platen is down and to cause the detent to automatically engage with said ratchet-wheel when the platen is turned up, and having also a finger-piece adapted when pressed upon, while the platen is in its upturned position, to remove the detent from said ratchet-wheel to permit intentional rotation of said platen, substantially as described.

16. In a type-writing machine, the combination of a turn-up platen, a platen ratchet-wheel, a feed-roller hung by arms or links upon a rock-shaft supported in the platen-carrier, means for casting off said roller, and a gravity-detent for said ratchet-wheel pivoted upon said rock-shaft, substantially as described.

17. In a type-writing machine, the combination with a front bar of the platen-carrier, of a bracket mounted thereupon and adapted to carry either a paper-guide or a paper-roller, or both, a clamping-plate for said bracket engaging both the bar and the bracket, a screw for connecting the clamping-plate and the bracket, and a spring back of the clamping-plate whereby the bracket is held yieldingly and frictionally upon said bar and is adapted to be adjusted endwise thereof, substantially as described.

18. In a type-writing machine, the combination with the front bar of the platen-carrier, of a bracket adapted to carry either a paper-guide or a paper-roller, or both, consisting of the main part 117, the clamping-plate 118, the shouldered screw 119, and the spring 121, substantially as described.

19. In a type-writing machine, the combination with the front bar of the platen-carrier, of a bracket having a horizontal portion resting upon said bar, an upwardly-extending portion and a downwardly-extending portion, a paper-guide attached to said bracket, a paper-roller frame pivoted to the downwardly-extending portion of said bracket, a roller in said frame protruding through an opening in said paper-guide, a clamping-plate adapted to engage the upwardly-extending portion of said bracket and the under side of said front bar, a shouldered screw passing through said clamping-plate and engaging with said bracket, and a spring between the head of said screw and said clamping-plate, substantially as described.

20. In a type-writing machine, the combination with a platen, of a curved guide-finger terminating on the under side of said platen, and a thin band or presser attached at one end to the lower free end of said finger and connected to a spring-pressed device at its other end and arranged and operating to automatically conform to the surface of the platen and the paper thereon, as described.

21. In a type-writing machine, the combination with the platen, of a curved guide-finger, a thin metallic band or presser attached at one end to the lower end of said finger and attached at its other end to a spring-actuated arm or holder, substantially as described.

22. In a type-writing machine, the combination with a platen, of a curved guide-finger having a slot, a thin band or presser attached at one end to said finger and having also a slot and attached at its upper end to a spring-actuated arm or holder, and a feed-roller adapted to pass through said slots and bear upon the platen, substantially as described.

23. In a type-writing machine, the combination with a platen, of a curved guide-finger, and a thin band or presser attached thereto and to a pivoted spring-actuated arm or holder arranged on a movable or adjustable bracket, substantially as described.

24. In a type-writing machine, the combination of a platen, a bracket, a spring-actuated arm pivoted to said bracket and carrying a thin band or presser adapted to conform itself to the platen or the paper thereon, the said band or presser being attached to the pivoted arm or holder above the axis of the platen and being supported at its other end on the under side of the platen, substantially as described.

25. In a type-writing machine, the combination with an inking-ribbon and its ribbon-spools, of means for feeding said ribbon automatically only in the direction of its length and from one spool on to the other step by step during the course of the writing, a rotatory cam and intermediate devices connected to the ribbon and arranged to remain inactive during the entire longitudinal travel of the ribbon and adapted only to shift the ribbon sidewise, and means for manually rotating said cam a step at or about the end of the longitudinal travel of said ribbon whereby said ribbon is moved crosswise a step and a fresh field or portion thereof brought to position for use during the next longitudinal travel of the ribbon from one spool to the other; substantially as described.

26. In a type-writing machine, the combination with an inking-ribbon and its spools, of means for moving the ribbon automatically in the direction of its length only and from one spool to the other, a rotatory cam and intermediate devices for moving the said ribbon a step crosswise and arranged to be inoperative during the entire lengthwise feed of the ribbon, and means connected with the mechanism for reversing the longitudinal travel of the ribbon for rotating said cam a step after said longitudinal reversing action has been effected; substantially as described.

27. In a type-writing machine, an inking-ribbon having means for moving it longitudinally from one spool upon another and adapted to be moved crosswise by a rotatory cam and intermediate devices, in combination with means for manually turning said cam step by step, said means being adapted also to lock the shaft by which the ribbon-spool shafts and ribbon-spools are rotated, so that in the act of locking said driving-shaft on reversal of the longitudinal travel of the ribbon the cam is simultaneously partially rotated and the ribbon fed or moved a step widthwise or crosswise, substantially as described.

28. In a type-writing machine, the combination of an inking-ribbon, a pair of ribbon-spools connected together, a pair of ribbon-spool shafts provided each with a bevel-gear, a driving-shaft having an endwise movement and provided with bevel-gears and adapted to engage and alternately drive the ribbon-spool gears, a cam mounted to turn on said driving-shaft and provided with notches or teeth, a pivoted arm or lever for locking said shaft against endwise movement, and a driving-pawl mounted upon said arm or lever to partially rotate said cam during the locking of the driving-shaft and simultaneously through intermediate mechanism connected to the ribbon-spools effect a crosswise movement of the inking-ribbon, substantially as described.

29. In a type-writing machine, the combination of an inking-ribbon, a pair of ribbon-spools connected together so as to move endwise in unison, and mechanism for moving said spools, consisting essentially of the slotted lever, the pivoted arm for vibrating the same, the cam for vibrating said arm, and means for turning said cam step by step, the said pivoted arm being arranged between said slotted lever and said cam and connected at its free end to each of said devices whereby the rotation of said cam effects the vibration of said slotted lever, and through the connection to the ribbon, a transverse movement thereof substantially as described.

30. In a type-writing machine, the combination of an inking-ribbon, a pair of ribbon-spools connected together so as to move endwise in unison, a sliding bar, a slotted lever attached thereto at one end, a pivoted arm connected by the intermediate pin 184 to said lever and also to an underlying cam, and means for turning said cam step by step, substantially as described.

31. In a type-writing machine, the combination of an inking-ribbon, a pair of ribbon-spools connected together so as to move endwise in unison, a sliding bar connected thereto, a slotted lever connected thereto at one end, a rotatory cam, an intermediate pivoted arm connected to said lever and to said cam, a driving-shaft for rotating the spool-shafts and movable endwise, and means for simultaneously locking said shaft and partially rotating said cam, substantially as described.

32. In a type-writing machine, the combination of an inking-ribbon, ribbon-spools, ribbon-spool shafts, a driving-shaft adapted to alternately rotate said ribbon-spool shafts and movable endwise, a latch for holding said shaft in either of its two positions, and which must be manually moved to unlock said shaft before it can be shifted, mechanism connected with the ribbon-spools for causing them and the ribbon to move transversely, and means for actuating said ribbon-moving mechanism connected to and operated simultaneously with said driving-shaft latch, when it is manually operated independently again to relock said driving-shaft, substantially as described.

33. In a type-writing machine and in a ribbon-moving mechanism substantially as set forth, the combination with the driving-shaft and with the cam, of a lever carrying a latch or locking device for said shaft and also a driving-pawl to actuate said cam, substantially as described.

34. In a type-writing machine and in a ribbon-moving mechanism substantially as set forth, the combination with the driving-shaft and with the cam, of a lever carrying a latch or locking device for said shaft, and a spring-actuated driving-pawl to engage teeth or notches on said cam, and means for limiting the vibration of said lever, substantially as described.

35. In a type-writing machine and in a ribbon-moving mechanism, the combination with the driving-shaft having grooves, and the cam having teeth, of a lever carrying a fork and a spring-actuated driving-pawl, substantially as described.

36. In a type-writing machine and in a ribbon-moving mechanism, the combination with the driving-shaft having an endwise movement, of a cam mounted loosely thereupon to rotate independently thereof and having at one end a flange and intermediate neck, and a flange or shoulder on the framework for engaging said flange on its inner side to prevent the cam from moving endwise, while at the same time permitting it to rotate step by step, substantially as described.

37. In a type-writing machine, a detachable inking-ribbon plate extending across the machine and connecting one spool with the other, so that both spools may be moved endwise in unison and the ribbon carried bodily back and forth in the direction of its width, substantially as described.

38. In a type-writing machine, the combination with an inking-ribbon adapted to move transversely, of a sliding plate detachably connected by depending forks to the ribbon-spools, overlying the inking-ribbon, and connected thereto, substantially as described.

39. In a type-writing machine, the combination of an inking-ribbon, a pair of ribbon-spools, means for moving one of said spools endwise, and a detachable plate connected at one end with said spool and extending horizontally across the top plate and provided at its other end with depending forks to engage the other ribbon-spool, whereby both spools, the ribbon and the said plate are caused to move bodily in unison, substantially as described.

40. In a type-writing machine, the combination of an inking-ribbon, a pair of ribbon-spools, means for moving one of said spools endwise, and a plate connected to said spool at one end and extending horizontally across the machine, and provided at its opposite end with a fork or pair of fingers to embrace the other of said ribbon-spools and move it, substantially as described.

41. In a type-writing machine, the combination of an inking-ribbon, a pair of ribbon-spools a horizontally-arranged bodily-movable hinged and detachable plate which overlies the horizontal portion of the inking-ribbon between the spools and which is provided with means for holding and guiding said portion of the ribbon and causing it to move transversely with said spools and said sliding plate, means for guiding said plate, and depending forks for embracing the spool-heads, substantially as described.

42. In a type-writing machine, the combination of an inking-ribbon, a pair of endwise-movable ribbon-spools, and an intermediate hinged and detachable horizontally-arranged connecting, sliding, shielding and ribbon-moving plate, substantially as described.

43. In a type-writing machine, the combination of an inking-ribbon, a pair of ribbon-spools, a fork or pair of arms for moving one of said spools endwise, and a plate detachably connected at one end to said fork or pair of arms and extending across the machine and provided at its opposite end with a fork or pair of arms to embrace the other ribbon-spool, substantially as described.

44. In a type-writing machine, the combination of an inking-ribbon, a pair of ribbon-spools, and an intermediate detachable, hinged and sliding connecting-plate provided with a type-opening and with ribbon-guides on its under side which also support the horizontal portion of the ribbon and cause it to move crosswise with said plate, substantially as described.

45. In a type-writing machine, the combination of an inking-ribbon, a pair of ribbon-spools, a reciprocatory ribbon-spool carrier, a guide-rod therefor, a ribbon-plate detachably mounted upon said guide-rod at one end and movable with said ribbon-spool carrier, and having means at its opposite end to detachably engage with the other ribbon-spool, substantially as described.

46. In a type-writing machine, the combination of an inking-ribbon, a pair of ribbon-spools, a reciprocatory ribbon-spool carrier, a guide-rod therefor, an inking-ribbon plate attached at one end to said rod and at its opposite end to the other ribbon-spool, the said rod being also adapted to turn when the ribbon-plate is swung up, and means for holding said rod and said ribbon-plate when the latter is in its upturned position, substantially as described.

47. In a type-writing machine, the combination of an inking-ribbon, a pair of ribbon-spools, a ribbon-spool carrier connected to one of said spools, a horizontally-arranged plate connected at one end to said carrier and at its other end to the opposite spool, a slotted lever connected to said ribbon-spool carrier, a pivoted arm connected to said plate and to an underlying cam, means for rotating the ribbon-spool shafts, including a sliding driving-shaft, and means for rotating said cam, carrying also means for locking said driving-shaft, substantially as described.

48. In a type-writing machine, the combination of the ribbon-spool carrier, the guide-rod therefor, the sliding ribbon-plate hooked upon said rod, pivots for said rod, whereby the ribbon-plate may be swung upwardly, and a spring-catch engaging with said rod to hold it and the ribbon-plate when the latter is in its upturned position, substantially as described.

49. In a type-writing machine, the combination of the ribbon-spool carrier, the ribbon guide-rod mounted on pivots and having at one end a toothed flange, a spring-catch to engage with the same, and a ribbon guide-plate attached at one end to said guide-rod, the ribbon guide-plate having a hook at one end, a fork at the opposite end, a central type-opening, and oppositely-disposed supporting and guiding fingers arranged on the under side of said plate and one on each side of said opening, substantially as described.

50. In a type-writing machine, the combination of two endwise-movable ribbon-spools, an inking-ribbon adapted to pass from one to the other, a sliding inking-ribbon plate extending across the machine and connecting one spool with the other, and adapted to cause both spools to be moved endwise in unison and the ribbon to be carried bodily back and forth in the direction of its width.

51. In a type-writing machine, the combination of an inking-ribbon, ribbon-spools connected together, ribbon-spool shafts provided with gears, an endwise-movable driving-shaft provided with gears for said spool-shafts, means for locking said shaft when it has been moved to disengage one ribbon-spool shaft and engage the other ribbon-spool shaft, and means connected to the inking-ribbon for moving it a step widthwise at the conclusion of its normal longitudinal travel, and simultaneously with each longitudinal reversing movement, and the said means being actuated by the means for locking the said driving-shaft after the latter has been moved endwise to change the direction of rotion of the spool-shafts.

52. In a type-writing machine, the combination with the bar of a platen-carrier, of a bracket bearing on one side thereof, a clamping-plate bearing on another side or portion of said bar and also engaging said bracket, means for holding said bar, bracket, and clamping-plate together, and a spring bearing against said clamping-plate for holding the parts with a yielding force; substantially as described.

Signed at Ilion, in the county of Herkimer and State of New York, this 14th day of January, A. D. 1895.

LOUIS P. DISS.

Witnesses:
W. K. JENNE,
B. B. VAN DEUSEN.